US008929690B2

(12) United States Patent
Doering et al.

(10) Patent No.: US 8,929,690 B2
(45) Date of Patent: Jan. 6, 2015

(54) MULTIPLE DISCHARGE DEVICE PANEL FIBER OPTIC FUSE STATE INDICATOR

(76) Inventors: Timothy J. Doering, Anoka, MN (US); Aaron Ephraim Bard, Columbia, MD (US)

( * ) Notice: Subject to any disclaimer, the term of this patent is extended or adjusted under 35 U.S.C. 154(b) by 572 days.

(21) Appl. No.: 13/222,420

(22) Filed: Aug. 31, 2011

(65) Prior Publication Data

US 2013/0049921 A1 Feb. 28, 2013

(51) Int. Cl.

| | |
|---|---|
| ***G02B 6/00*** | (2006.01) |
| ***H01H 85/30*** | (2006.01) |
| ***H01H 37/76*** | (2006.01) |
| ***H01H 85/042*** | (2006.01) |

(52) U.S. Cl.
CPC ............ *H01H 85/30* (2013.01); *H01H 37/767* (2013.01); *H01H 85/042* (2013.01)
USPC ................ 385/13; 385/12; 337/206; 361/644

(58) Field of Classification Search
USPC .......................................................... 337/206
See application file for complete search history.

(56) References Cited

U.S. PATENT DOCUMENTS

| | | | | |
|---|---|---|---|---|
| 4,604,613 | A * | 8/1986 | Clark ........................... | 340/638 |
| H248 | H | 4/1987 | Middlebrooks | |
| 5,019,937 | A | 5/1991 | Beard | |
| 5,045,733 | A | 9/1991 | Sendelweck | |
| 6,018,452 | A | 1/2000 | Meyerhoefer et al. | |
| 6,566,966 | B1 | 5/2003 | Bellaouar et al. | |
| 6,717,505 | B1 | 4/2004 | Bruchmann | |
| 7,119,651 | B2 | 10/2006 | Darr et al. | |
| 7,369,030 | B2 | 5/2008 | Darr | |
| 7,400,493 | B2 | 7/2008 | Ewing et al. | |
| 7,855,630 | B2 | 12/2010 | Darr | |
| 7,983,024 | B2 | 7/2011 | Harris, IV | |
| 8,289,123 | B2 | 10/2012 | Whitney et al. | |
| 2006/0087397 | A1 | 4/2006 | Henricks et al. | |

FOREIGN PATENT DOCUMENTS

JP 01253904 A * 10/1989

OTHER PUBLICATIONS

File History for U.S. Appl. No. 13/222,405, filed Aug. 31, 2011. Inventors: Randall J. Appleton et al.

* cited by examiner

*Primary Examiner* — Michelle R Connelly
(74) *Attorney, Agent, or Firm* — Patterson Thuente Pedersen, P.A.

(57) ABSTRACT

A fuse state indicator for a cascading fuse multiple discharge device including a fiber optic cable having a first end, a second end, and an intermediate segment. The intermediate segment is configured for attachment to a fuse assembly of a fuse panel where the fuse panel is arranged for physically severing the intermediate segment of the fiber optic cable in response to discharge of the fuse assembly.

15 Claims, 7 Drawing Sheets

MULTIPLE DISCHARGE DEVICE PANEL FIBER OPTIC FUSE STATE INDICATOR

This invention was made with Government support under U.S. Government Contract W911QX-08-C-0077, awarded by U.S. Army Contracting Command. The government has certain rights in the invention.

FIELD OF THE INVENTION

The present invention relates to indicators for fuse designs. More particularly, the present invention relates to indictors for remotely monitoring the operational status of individual fuse assemblies in multiple discharge device fuse panels having cascading switch designs.

BACKGROUND OF THE INVENTION

In recent years, there has been considerable improvement in the area of pulsed power research, which involves the storing, shaping, and performance of high energy density capacitors used in pulsed power applications. These pulsed power applications may require extremely high discharges of voltage and current. For example, discharges of high voltages in the 10 kV or more range and high current in the 150 kA or more range have been proposed. Historically, high-energy electrical devices for pulsed power applications have been limited to a single discharge. Any subsequent discharges would require a time-intensive rebuilding and replacement of components before a second high energy discharge could take place. Repeatability of high energy discharges in the high power range in a short amount of time has been considered difficult or impossible to achieve based upon the extreme environment created by such discharges.

Not only are new designs needed for multiple large pulses of power in a short time period, but further secondary challenges presented by possible design solutions also must be overcome. One such challenge is how to effectively monitor the components utilized to provide these discharges, especially if certain components, such as fuses, limit the number of discharges the device can provide before replacement is needed.

Specifically, if a cascading fuse and switch design were to be used, how to monitor the operational status of the fuses or switches utilized would be problematic. Such monitoring is important to ensure that fuses are functional and fully intact given the extreme environment that electronics in such a device might be faced. Further, remotely monitoring the device is desired in order to provide an operator a safe environment, especially if the discharge device is in a difficult to access location. Accordingly, a sensor or indicator in such a device is needed which would not be damaged by large pulses of power and would not cause an operator to be subjected to high voltage when investigating the status of the internal fuses and switches.

Therefore, what is needed is an indicator for a switch and fuse device which overcomes deficiencies of the past, and which enables effective monitoring of fuses or switches that protect electronics from multiple, high-voltage, high-current discharges of pulsed power.

SUMMARY OF THE INVENTION

The present invention overcomes the problems of the prior art by providing a device, system, and method for indicating the operational status of the various fuse assemblies of a cascading switch located on a multiple discharge device. More specifically, remote monitoring of fuse assemblies is accomplished through use of specially designed fiber optic indicators which are not harmed or compromised by large amounts of pulsed power due to the advantageous design and dielectric properties of fiber optic components.

In one embodiment, a fuse state indicator for a cascading fuse panel includes a fiber optic cable having a first end, a second end, and an intermediate segment. Further, the intermediate segment is configured for attachment to a fuse assembly of a fuse panel where the fuse panel is arranged for physically severing the intermediate segment of the fiber optic cable in response to discharge of the fuse assembly.

In another embodiment according to the present invention, a fuse indicator system for a fuse panel is disclosed including a multiple-discharge fuse panel and a plurality of fiber optic cables. The fuse panel includes a plurality of cascading, single use fuse assemblies each containing a perforated plate portion arranged for movement upon discharge. Further, the plurality of fiber optic cables each have a cable associated with a specific one of the fuse assemblies. Each cable includes a first end, a second end, and an intermediate segment, where the intermediate segment is located adjacent the plate portion of the fuse assembly and is arranged to be severed in response to movement of the plate portion. This severed arrangement prevents light transmission from the first end of the fiber optic cable to the second end of the fiber optic cable to indicate fuse assembly use.

According to an embodiment of the present invention, a method is provided for relaying information related to the operational status of a fuse assembly present in a cascading switch of a panel assembly. The method includes applying a light source to a first end of a gang of fiber optic cables, the individual cables each having an intermediate segment coupled adjacent a different fuse assembly and a second end spaced apart from the second ends of the other cables. The method further includes viewing the second ends of the cables to observe which cables transmit light from the first end.

In another embodiment according to the present invention, a method is provided for determining when to replace a cascading fuse panel. The method includes providing fiber optic cables and housings that each hold a "U" shaped segment of cables for mounting adjacent fuse assemblies on a cascading fuse panel. The method also includes providing instructions for checking the operational status of the fuse assemblies, including, applying a light source to one end of the fiber optic cables and observing which fiber optic cables transmit light to an opposite end.

BRIEF DESCRIPTION OF THE DRAWINGS

The invention may be more completely understood in consideration of the following detailed description of various embodiments of the invention in connection with the accompanying drawings, in which.

DETAILED DESCRIPTION OF THE PREFERRED EMBODIMENTS

Figure 1:
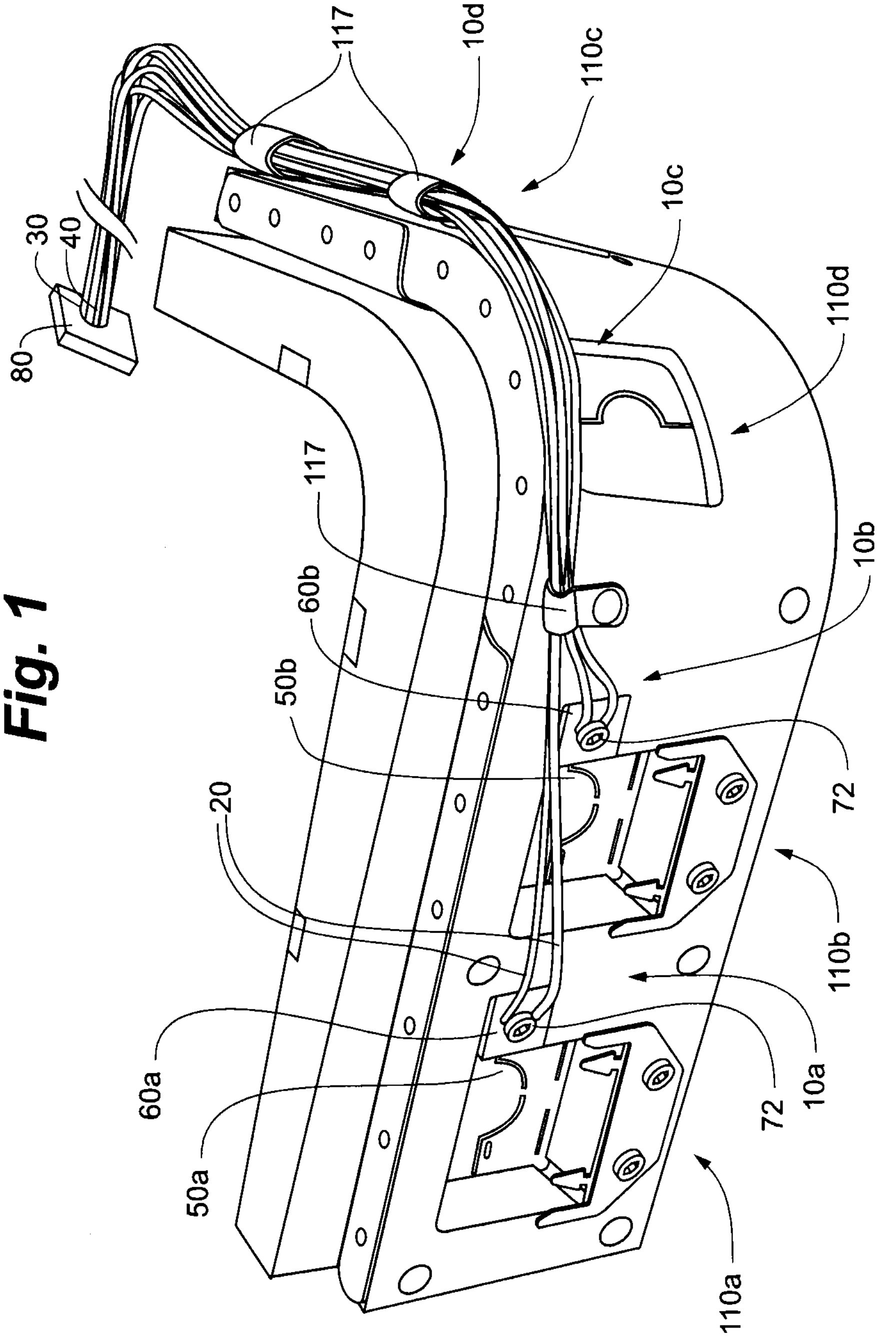
FIG. 1 illustrates generally a perspective view of a multiple discharge device and fuse state indicators according to an embodiment of the invention.

The invention may be embodied in other specific forms without departing from the essential attributes thereof, therefore, the illustrated embodiments should be considered in all respects as illustrative and not restrictive.

In FIGS. 1-8, embodiments are disclosed of apparatus, methods, and systems related to fuse state indicators 10 for a multiple discharge device or fuse panel 100 having a cascading switch and fuse design. Fuse status indicators and systems implementing such indicators are disclosed for fuse panels 100 incorporating a plurality of cascading, single discharge fuse assemblies 110. Multiple discharge devices refer to any housing component for multiple fuses which is used to protect electronics and is not limited to any particular shape of pulsed power application. In general, fuse indicators 10 are disclosed which include a fiber optic cable 20, having a first end 30, a second end 40 and an intermediate segment 50. The intermediate segment 50 being further held in place by a fiber optic loop holder 60 adapted for mounting adjacent a fuse assembly 110 of a multiple discharge device 100. Further, the type of multiple discharge devices 100 utilizing these fuse status indicators 10 are designed to respond to use of the individual fuse assemblies 110 with physical movement of a portion of the panel associated with the respective fuse assembly 110 that has been discharged. The fuse status indicators 10 accordingly use fiber optic cables 20, and the capability of these cables 20 to transmit light to determine if individual fuse assemblies 110 have been used. Both the arrangement provided as well as the dielectric properties of fiber optic material allows the indicator to be largely unaffected by large pulses of power.

Accordingly, testing whether the fuse assemblies 110 have been used simply requires a light source 62 (not shown), such as a flashlight, to be exposed to a first end 30 of a fiber optic cable 20. If the fuse assembly 110 adjacent the intermediate section 50 of the fiber optic cable 20 has not been used, light will be transmitted to the second end 40 of the cable 20. If the fuse assembly 110 has been used, the intermediate segment 50 of the cable 20 will be in a severed state and no light will be transmitted to a second end 40 of that cable 20. Based on this arrangement, operation of one or more fuse indicators 10 is made possible. For purposes of describing the state of the fuse assemblies 110, a fuse assembly 110 will be considered “used” and the fuse “discharged” when the resistor contained in the assembly has exploded due to a large pulse of power.

Figure 2:
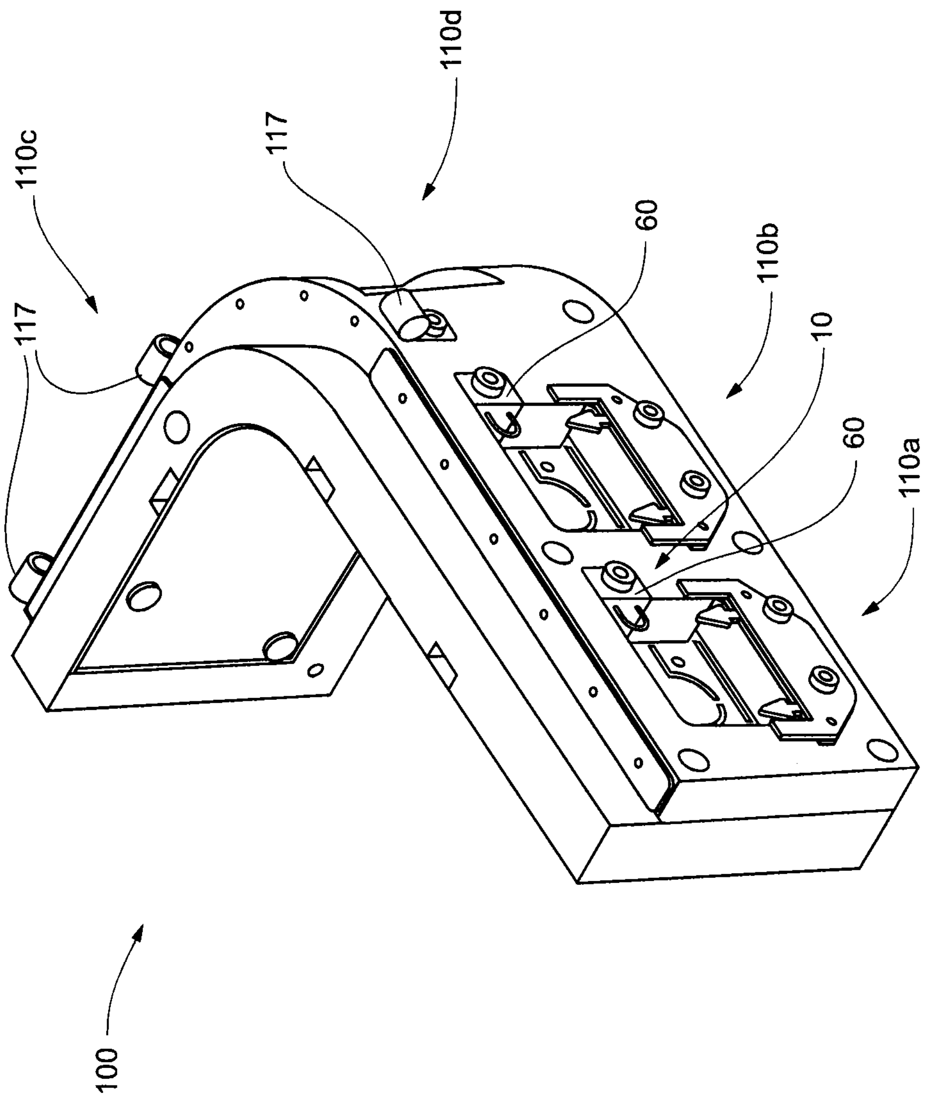
FIG. 2 illustrates generally some fuse state indicator components and a multiple discharge device according to an embodiment of the invention.
Figure 3:
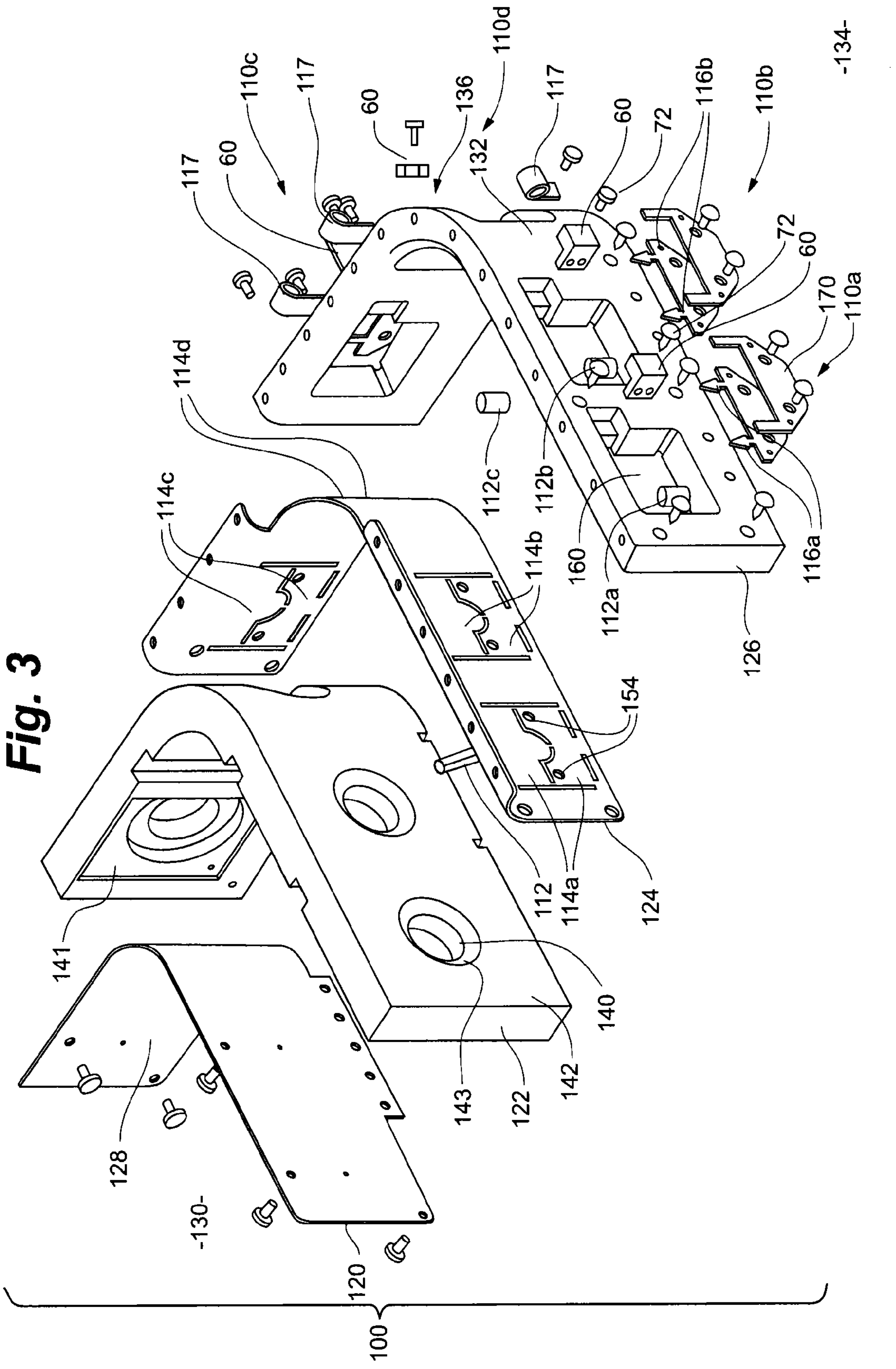
FIG. 3 illustrates generally an exploded view of some fuse state indicator components and a multiple discharge device according to an embodiment of the invention.

FIGS. 1-3 disclose an example of a fuse panel 100 for use with fuse state indicators 10. Specifically, fuse state indicators 10 are mounted in or partially mounted in the multiple discharge device 100 shown. FIGS. 1 and 2 show a multiple discharge device 100 with fuse state indicators 10 in an assembled and partially assembled configuration and FIG. 3 shows an exploded view of the panel 100 together with fuse state indicator components. For purposes of this application, the fiber optic cables 20 have been removed from FIGS. 2 and 3 to provide greater clarity of the surrounding multiple discharge device components. The multiple discharge device 100 depicted is a generally an elongate structure largely comprised of multiple elongate conductive plates and non-conductive housing panels of material stacked in adjacent side-by-side relation to one another. Further, arranged as a part of the panel 100 are a plurality of spaced-apart fuse assemblies 110 which utilize a combination of resistors 112, perforated plate portions 114 (also referred to at times as perforated panels 114) and spear shaped contacts 116. These fuse assemblies 110, taken in combination, cooperate to form a cascading switch and fuse design. In this particular embodiment, four fuse assemblies 110 are present. Mounted adjacent to each of these fuse assemblies 110 are the components of fuse state indicators 10. In general, the fuse state indicators 10 are used to determine whether the adjacent fuse assembly 110 is available for use or whether its fuse has been used up and its functionality is likely in an altered or diminished state. The fiber optic cables 20 extending away from each of the fuse assemblies 110 are supported by various cable brackets 117 mounted in the panel 100. The four fuse assemblies 110 have been labeled 110*a*, 110*b*, 110*c*, and 110*d* in some of the figures and description for convenience of reference. Components associated with one of these particular fuse assemblies, likewise, may be labeled with reference numerals ending in “a”, “b”, “c”, and “d”, to indicate the fuse assembly 110 they are respectfully associated with.

The multiple discharge device 100 generally is a part of a larger pulse power system which sends out very large power pulses through this panel 100. For example, discharge of voltages in the 10 kV or more range and current in the 150 kA or more range are possible. The fuse assemblies 110 provided in this panel 100 function to both allow discharges of an entire power supply as well as to provide an energy pulse delay device. The fuse assemblies 110 are single use components in the sense that they only provide protection from a single large discharge of pulsed power. Small amounts of power that can readily pass across the fuse assembly and which are not detrimental to the resistors 112 are not considered to be such a use nor is the reconfigured circuit using components of the assembly after resister explosion considered a use. When fuse assemblies 110 are subjected to a large pulse of power, a resistor 112 mounted within a cavity of the panel 100 explodes and a perforated plate portion 114 is flung open. This plate portion can be perforated in various ways. The perforated plate portions 114 shown in FIGS. 1-7 are perforated such that two sections are present, namely, an upper section 119 and a lower section 121. They are divided by a nearly continuous slot which is horizontally disposed on the sides 123 and which is disposed in a semicircular fashion near the center 125 of the plate. Additionally, parallel to the top and bottom of the opening for the fuse assembly are additional partial horizontally disposed slots 127. Based on these perforations, the panels will generally fold open into two segments when subjected to a force such as an explosion of the resistor 112. This explosion results in the lower section 119 of the perforated panel 114 engaging a set of electrical contacts to complete the circuit with the next fuse assembly 110 in the cascading circuit. Further, the explosion and temporary disconnection of the first fuse assembly 110 provides the necessary delay needed in the system to dissipate the pulse.

The explosion and the flinging open of a perforated plate portion 114 also provides the moving parts that make the fuse state indicators 10 described herein possible. An intermediate segment 50 of a length of fiber optic cable 20 is coupled adjacent each of the fuse assemblies 110 with both ends of the cable 30 and 40 located at remote locations from the fuse assembly 110. Further, the intermediate segment 50 extends in the anticipated path of the perforated plate portion 114 when it is flung open into a folded disposition. Accordingly, the portions 114 will sever the intermediate segment 50 of the fiber optic cable 20 following an explosion of its resistor 112.

Consequently, the fiber optic cable 20 can convey to an operator whether the associated fuse assembly 110 has been used based on simply shining a flashlight, or other light source, on a first end 30 of the fiber optic cable 20 and observing whether the light is being transmitted to the second end 40 of the fiber optic cable 20. If the cable 20 transmits light, then the fuse assembly 110 is not used and is still available for use. If the cable 20 does not transmit light, then the associated fuse assembly 110 has been used and can no longer be used to protect against a large discharge pulse. While use of one or more fuse assemblies 110 may not require replacement of the entire panel 100, if all or many of the fuses are no longer available, replacement of the fuse panel 100 may be desired. By having a different fiber optic cable 20 associated with each individual fuse assembly 110, an operator can quickly check each of the fuse assemblies 110*a*, 110*b*, 110*c*, and 110*d* to determine if a replacement panel 100 is needed. As these types of high energy discharge panels 100 are frequently buried deep inside a discharge device and are sometime not accessible without destroying the entire discharge device, it can be very important to know how many and which fuse assembly switches are still operable so that replacement can be done at an appropriate time.

Figure 4:
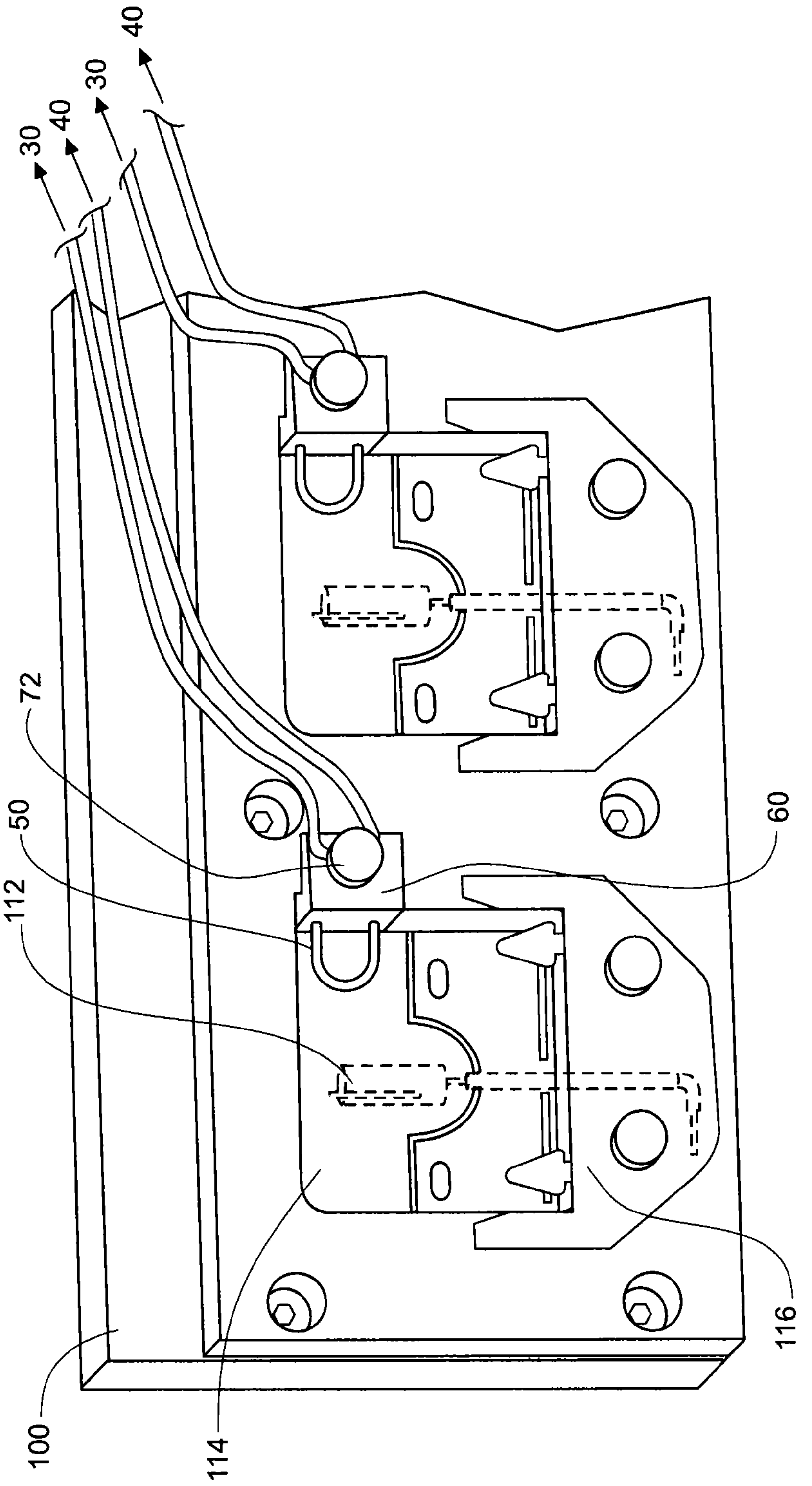
FIG. 4 illustrates generally a partial front perspective view of two fuse assemblies of a multiple discharge device equipped with fuse state indicators according to an embodiment of the invention.
Figure 5:
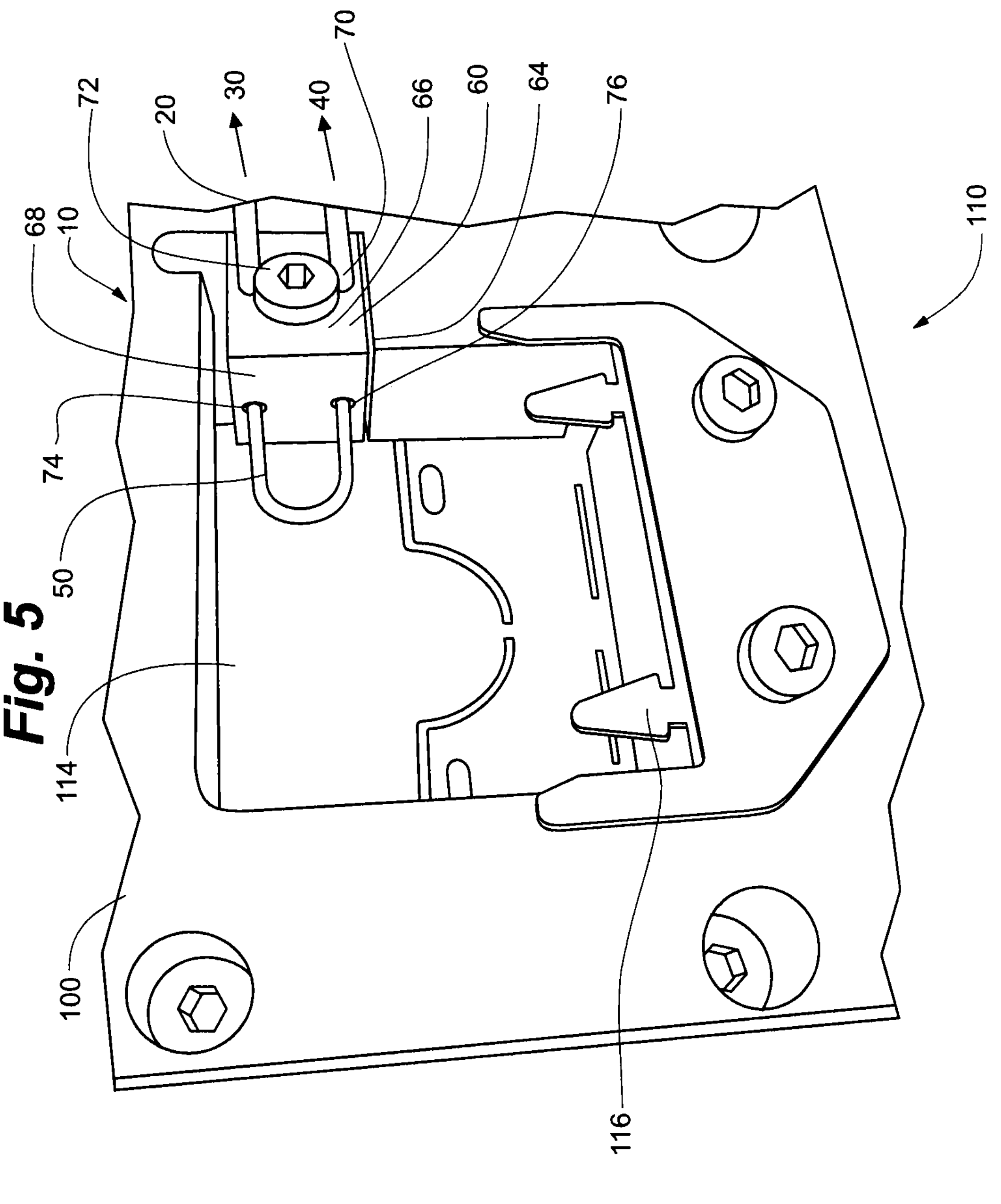
FIG. 5 illustrates generally a perspective view of a fuse assembly of a multiple discharge device equipped with a fuse state indicator according to an embodiment of the invention.

FIGS. 4 and 5 provide detailed views of various fuse assemblies 110 mounted into portions of multiple discharge device 100 and the location of fuse indicators 10. Specifically, the fiber optic loop holders 60 are incorporated into recesses 64 adjacent the opening provided by each of the fuse assemblies 110. The fiber optic loop holders 60 are generally small box shaped housings having an "L" shaped cross section and a first face 66 that is mounted parallel to the face of the panel 100 and a second face 68 mounted parallel to the inner wall of passageways in the fuse assemblies 110. A single continuous cable 20 extends from a first end 30 into the front face 66 of the fiber optic loop holder 60 in an aperture 70 shared by a fastener 72. The cable 20 extends out a side aperture 74 in the face 68 of the loop holder 60 into a passageway formed by the fuse assembly 110 and back into another aperture 76 in the loop holder 60 such that the intermediate segment 50 of the cable is disposed in a "U" shaped configuration. The cable 20 then exits out the aperture 70 shared by fastener 72 and extends back to the second end 40 of the cable. The portions of the cable 20 entering and exiting the face 66 of the loop holder 60 contain an outer protective sheath covering the optical fibers of the fiber optic cable. The "U" shaped intermediate segment 50 of the cable does not contain a sheath. The unsheathed fiber optic cable is sufficiently rigid that a rapid movement by the perforated plate portion 114 will readily sever the "U" shaped loop.

Figure 7:
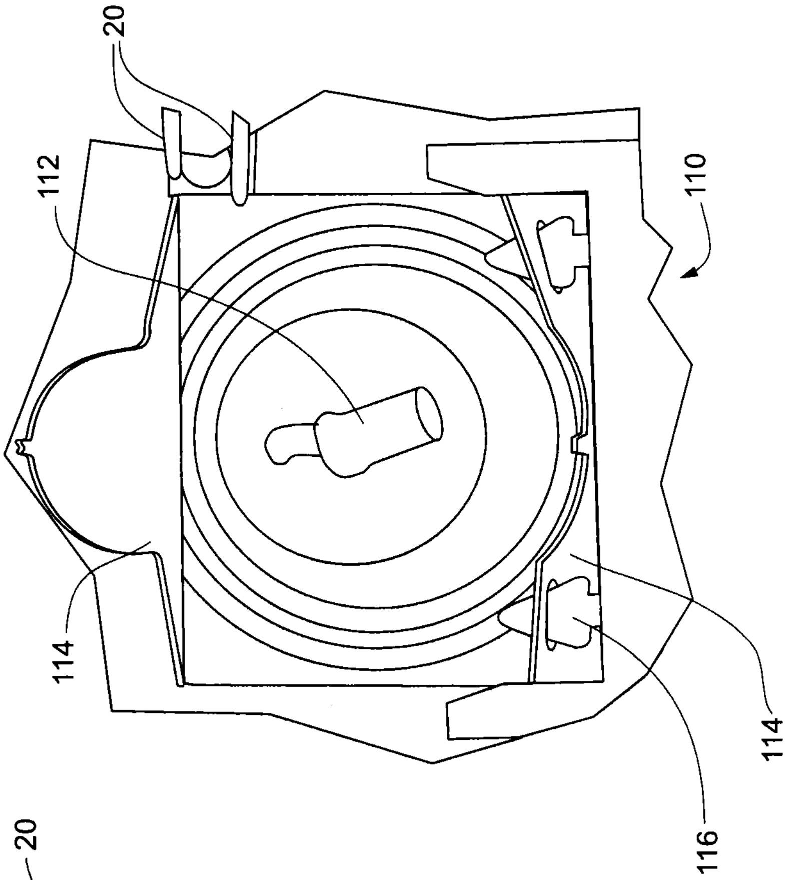
FIG. 7 illustrates generally a perspective view of a fuse assembly of a multiple discharge device and a fuse state indicator after fuse discharge where the resistor of the fuse assembly has exploded according to an embodiment of the invention.
Figure 6:
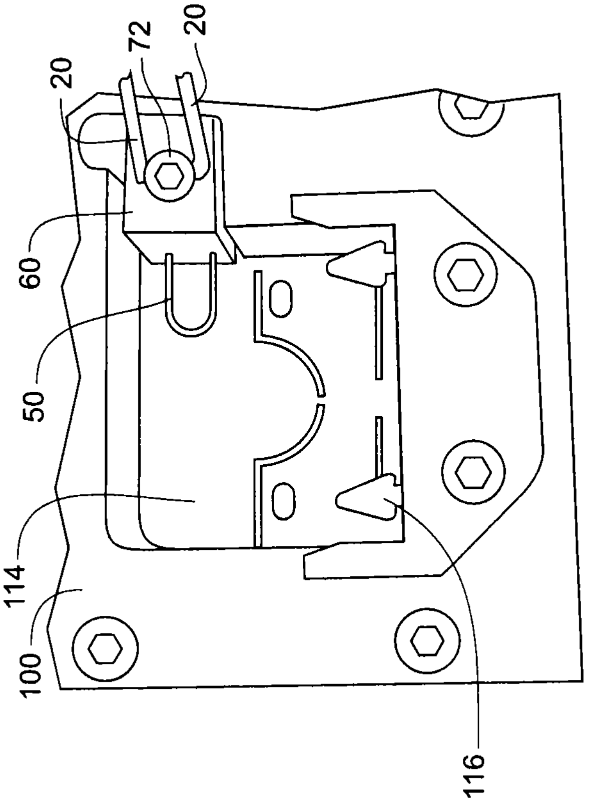
FIG. 6 illustrates generally a perspective view of a fuse assembly of a multiple discharge device and a fuse state indicator prior to fuse discharge according to an embodiment of the invention.
Figure 8:
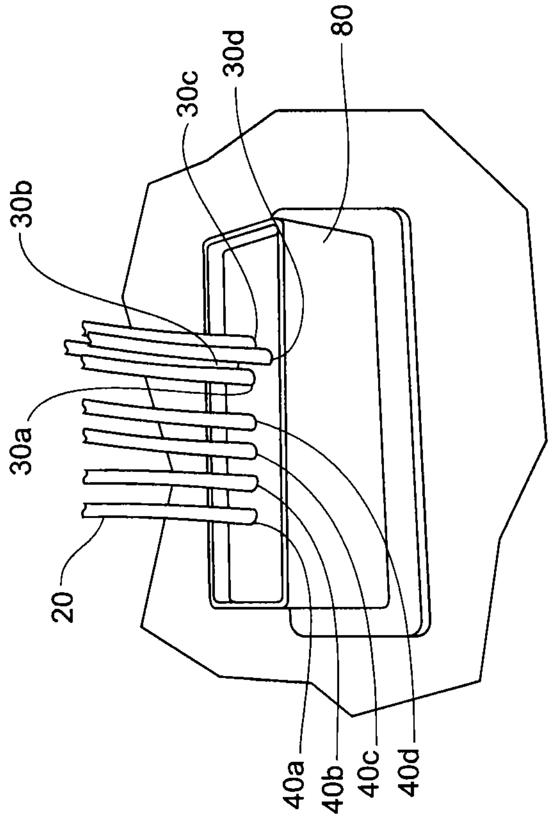
FIG. 8 illustrates generally a perspective view of an indicator block containing the ends of the fiber optic cables according to an embodiment of the invention.

Operation of the fuse state indicators 10 can be better understood from FIGS. 6-8. First, FIG. 6 shows a perspective view of a fuse assembly 110 of the EPS panel 100 equipped with a fuse state indicator 10 prior to use and explosion of the resistor 112 of the fuse assembly. As seen here, the unsheathed intermediate segment 50 of the cable 20 resides in the fuse assembly 110 in a continuous "U" shaped loop. The perforated plate portions 112 are located behind the intermediate segment 50 in a parallel flat arrangement. Although, not shown in FIG. 6, a resistor 112 is connected in circuit directly behind the perforated plate portions 112 within a cavity in the panel 100. When that circuit is subjected to a large pulse of power, the resistor 112 explodes and the perforated plate portions 112 are flung open. More specifically, the portions 114 are folded up against the top and bottom walls of the fuse assembly passageway, as shown in FIG. 7.

FIG. 7 depicts the fuse assembly 110 and fuse state indicator 10 of FIG. 6 after use where the resistor 112 of the fuse assembly 110 has exploded. In this state, the "U" shaped loop of the intermediate segment 50 has been sheared off due to the forceful movement of the perforated plate portions 114. At this point, because the cable 20 is no longer continuous, light will no longer be able to be transmitted from a first end of the cable 30 to a second end of the cable 40. The "U" shaped configuration generally provides portions of cable 20 that are aligned in a parallel fashion which helps to ensure that the remaining sheared fiber ends are not only severed, but also not aligned with each other.

Next, in FIG. 8 an indicator block 80 is shown which houses the ends of fiber optic cables 20 for the fuse state indicators 10. This indicator block 80 serves as the interface of an operator who is located remotely from the fuse assemblies 110 of the fuse panel 100 for determining the status of each of the four fuse assemblies 110*a*, 110*b*, 110*c*, and 110*d* of the panel. Shown on the right side of FIG. 8 is a round gang of four cables 20. The ends of these four cables represent the first ends 30*a*, 30*b*, 30*c* and 30*d* of their respective cables 20. Therefore, there is one cable 20 for each of the four fuse assemblies 110 of the panel. On the left side of the indicator block 80 are four in-line fiber optic cables representing the second ends 40*a*, 40*b*, 40*c*, and 40*d* of the four fuse assemblies 110.

Accordingly, indicator block 80 allows an operator to check the state of the fuse assemblies 110 by shining a flashlight into the ends of the round gang of four cables 20 located on the right side of FIG. 7 while looking at the ends 40 of the four in-line cables 20 located on the left side the figure. A light at one of the in-line, second ends 40*a*-*d* of the cable 20 indicates that the respective fuse assembly 110 associated with that specific cable is good (i.e. the perforated plate 114 has not sheared the fiber optic cable 20 during discharge). No light at the end of one of the cables 20 means that the fuse assembly 110 associated with that cable 20 has already been discharged. Accordingly, an operator can quickly review this indicator block 80 with nothing more than a flashlight to determine if which fuse assemblies 110 have been discharged.

Although, one multiple discharge device design with cascading switches for protecting devices from large energy pulses is shown in FIGS. 1-8. Further discussion of the structure and operation of such a cascading switch and fuse design are set forth in the following as well as in copending patent application of Ser. No. 13/222,405 by Doering et al., titled MULTIPLE DISCHARGE DEVICE CASCADING SWITCH AND FUSE DESIGN, which is hereby incorporated by reference in its entirety.

For further reference, a more detailed discussion of the operation of an example of a multiple discharge device like the one in FIGS. 1-8 is discussed in the following description. In general, in a multiple discharge device design with cascading fuse assemblies, the panel 100 has four large structural panel components, namely, a perimeter plate 120, a first housing panel 122, an interior plate 124, and a second housing panel 126, as seen in FIG. 3. When assembled, the plates and panels are combined and are generally disposed between a first major face 128 at side 130 of the panel 100 and a second major face 132 at side 134 of the panel 100. In the embodiment shown, the plates and housing panels each have a radiused bend 136 and are accordingly stacked adjacent one another around this corresponding shape. A bended shape may be used in certain specific discharge devices, however, the shape is not critical to the function of the panel and accordingly, the panel 100 may be flat or otherwise shaped to appropriately suit a particular device or application.

The perimeter plate 120 is generally made of metal or other conductive material and has a flat or radiused surface that corresponds to the adjacent first housing panel 122. The perimeter plate 120 is largely one continuous plate that is largely isolated from interior plate 124. Perimeter plate 120 includes connections leading to a plurality of resistors 112 at discrete spaced apart locations along the panel 100. The plate 120 further has a plurality of apertures 138 that may be used with various connectors 139 for holding the plate 120 and the remainder of the panel 100 together.

The first housing panel 122 is a structure having spaced-apart centrally disposed cavities 140 across its length. In the FIGS. 1-7, these cavities 140 are shown as apertures defined by cylindrical passageways extending from one primary face 141 to the opposite primary face 142 of the first housing panel 122. The passageways provided by cavities 140 further have cylindrical depressions 143 that encircle the central passageway but do not extend all the way through the panel 122. Resistors for the cascading circuit are located within these cavities 140, where each cavity 140 contains a single resistor 112.

The interior plate 124 is a plate made of copper or other conductive material and has a flat or radiused surface similar to that of the perimeter plate 120. At spaced-apart locations across the plate, portions of the plate are perforated such that perforated plate portions 114 are defined. These perforated plate portions 114 are formed at locations aligned with the cavities 140 of the adjacent first housing panel 122. The perforated plate portions 114 define an upper flap portion which is largely rectangular but which contains a semicircular projecting tab extending from the lower edge and a lower flap portion of largely rectangular shape which contains a semicircular recess within the upper edge in mating relation to the projecting tab. The lower flap contains oval shaped apertures adjacent both sides of the semicircular recess.

The second housing panel 126 is a further non-conductive housing structure of the panel that abuts against the interior plate 124 when the panel 100 is assembled. The second housing panel 126 contains spaced-apart, centrally disposed passageways 160 across the length of the second housing panel 126 with spacing similar to that of the cavities 140 that are disposed across the first housing panel 122. The passageways 160 are shown as square passageways, although the possibility of passageways of other shapes and sizes is contemplated as well. The passageways 160 are aligned such that they correspond to the perforated panels of the interior plate 124. Further, fuse status indicators 10 or other sensors may be located in the interior wall of passageways 160 adjacent the opening provided by these passageways. Such sensors may be used to measure one or more parameters related to the particular fuse assembly 110 or to indicate the operational status of the assembly 110.

The outward face of the second housing panel 126, also referred to as the second major face 132 of the panel 100, further contains a plurality contact plates 170 with spear-shaped contacts 116. These plates 170 and contacts 116 may be separate components or integrally formed components. The spear shaped contacts 116 of the plates each project upwardly in a converging manner at each of the lower corners of the passageways 160. The contacts 116 are aligned with, but spaced apart from the apertures 154 in the perforated plate portions 114 of the interior plate 124 when in the assembled state shown in FIGS. 1, 2, and 4-6, for example. Projections of shapes other than spears as part of the contact plates 170 are possible. Likewise, coupling interactions other than those between spear shaped contacts and apertures, such as latches or other well-known coupling components are contemplated by this disclosure as well.

Although in an open circuit configuration, the contact plate 170 of the fuse assembly 110 is also connected in circuit to a second resistor 112 within a cavity 140 before establishing a connection with perimeter plate 120. This connection between the contact plate and the resistor 112 and perimeter plate 120 largely cannot be seen in the Figures, as it is made possible by wiring passing through an aperture in the body of the second panel housing 126.

Accordingly, the assembled panel 100 set forth in FIGS. 1-8 can be understood to generally refer to a panel that is equipped with a plurality of fuse assemblies 110 that are connected in a cascading arrangement. The four fuse assemblies 110 shown in the figures have been labeled **110*a*, 110*b*, 110*c*, and 110*d*** in order of their cascading use. The corresponding components of each assembly may be referred to with a nomenclature of "a", "b", "c" or "d" denoting the fuse assembly each part is associated with for convenience as well.

Prior to use of the panel, of the four fuse assemblies **110*a*, 110*b*, 110*c*, and 110*d*, only fuse assembly 110*a* and its resistor 112*a* provides a continuous connection between the power source and discharge device. Specifically, this provides a connection between the perimeter plate 120 and the interior plate 124 in the panel. The three remaining fuse assemblies 110*b*, 110*c*, and 110*d* are not connected and the resistors 112*b*, 112*c*, and 112*d*** are initially in open circuit configuration.

Operation of the panel 100 begins when a large pulse of power is experienced by the panel. First, the discharge device short circuits and current begins to flow through the first fuse assembly **110*a*. As the current builds, the energy is enough to explode the resistor 112*a* in the first fuse assembly, essentially turning it into a fuse. The exact values of the exploding resistor being dependent upon the delay required. This explosion does two things. First, it provides the required delay in the pulse required by the multiple discharge device. Second, the pressure it creates causes the perforated plates 114*a* to deform along the preformed features, such that the lower flap 152 bends and causes apertures 154 to be forced down around and against the two spear shaped contacts 116*a* in a locked configuration. An example of this resulting configuration can be seen in FIG. 7, for example. The locking completes the circuit for the next fuse assembly 110*b* which is now continuous. Thereafter, when a subsequent large pulse of power is experienced by the discharge device, the process is repeated by fuse assembly 110*b* and the fuse assemblies 110*c* and 110*d*** for subsequent pulses.

The final fuse assembly **110*d* is slightly different, however, as it is the last fuse on the panel. Accordingly, the last fuse does not have spear shaped contacts for completing the circuit, but rather disconnects the circuit until the entire discharge device can be replaced. The location and arrangement of this last fuse assembly 110*d* can be seen in FIG. 1. FIG. 1 generally depicts the assembled panel 100 from a slightly different front view. In this Figure, the fuse assembly 110*d* is shown oriented somewhat differently than the other assemblies. Namely, the perforated panels 114*d* are split vertically from top to bottom, rather than horizontally from side to side. Accordingly, when the resistor 112***d* explodes, the flaps of the perforated panels 114 will fold out against the sides of the passageway 160*d*.

Note that the resistors 112 used in this panel are general intended to be nominal resistors of the type typically used in electrical circuit designs of moderate power. Such moderate power is on a scale far less than the type of large pulses of power discussed in this application. In general, no specialized exploding components are necessary to carry out the explosions required for this design as the large pulses of power are enough to generate a reliable explosion when introduced to one of the resistors 112.

Accordingly, a cascading fuse and switch design is provided in this embodiment where four different pulses of power can be independently shielded by these fuses. Moreover, the cascading arrangement allows each subsequent fuse to be available within seconds of use of the previous fuse.

The embodiments above are intended to be illustrative and not limiting. Additional embodiments are within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A fuse state indicator for a cascading fuse panel, comprising:

a fiber optic cable having a first end, a second end, and an intermediate segment configured for attachment to a fuse assembly of a fuse panel, wherein the fuse panel is arranged for physically severing the intermediate segment of the fiber optic cable in response to discharge of the fuse assembly;

wherein the fuse assembly includes a resistor sized to explode upon discharge of a power pulse and a perforated plate portion adjacent the resistor, said plate portion positioned for severing the intermediate segment of the fiber optic cable.

2. The fuse state indicator of claim 1, wherein the fiber optic cable has a U-shaped bend in close proximity to the resistor.

3. The fuse state indicator of claim 2, wherein the U-shaped bend of the fiber optic cable is unsheathed.

4. The fuse state indicator of claim 1, wherein at least one end of the cable is mounted to an indicator block of material.

5. A fuse indicator system for a cascading fuse panel, comprising:

a multiple-discharge fuse panel, including a plurality of cascading, single use fuse assemblies each containing a plate portion arranged for movement upon discharge; and a plurality of fiber optic cables, each cable associated with a specific one of the fuse assemblies and each including, a first end, a second end, and an intermediate segment, wherein the intermediate segment is located adjacent the plate portion of the fuse assembly and is positioned to sever by movement of the plate portion so as to prevent light transmission from the first end of the fiber optic cable to the second end of the fiber optic cable.

6. The fuse indicator system of claim 5, wherein the intermediate segment of the fiber optic cables are bent at locations adjacent the associated plate portions.

7. The fuse indicator system of claim 5, wherein the fuse indicator system uses a light source at the first end of the fiber optic cable to determine if the fuse assemblies have been used.

8. The fuse indicator system of claim 5, wherein the first ends of the fiber optic cables are mounted in a common block of material.

9. The fuse indicator system of claim 5, wherein the second ends of the fiber optic cables are mounted in a common block of material.

10. A method for relaying information related to the operational status of a fuse assembly of a cascading switch of a panel assembly, comprising the steps of:

applying a light source to a first end of a gang of fiber optic cables, the individual cables each having an intermediate segment coupled adjacent a different fuse assembly and a second end spaced apart from the second ends of the other cables, wherein at least one perforated plate of the respective fuse assemblies is located adjacent the intermediate segment of each individual fiber optic cable;

viewing the second ends of the cables to observe which cables are transmitting light from the first end.

11. The method of claim 10, wherein the gang of cables contains at least three fiber optic cables coupled adjacent at least three fuse assemblies on the panel.

12. The method of claim 10, wherein the intermediate segment of the cables is bent in a U-shape.

13. A method for determining when to replace a cascading fuse panel, the fuse panel comprising a plurality of cascading, single use fuse assemblies each containing a plate portion arranged for movement upon discharge; and a plurality of fiber optic cables, each cable associated with a specific one of the fuse assemblies and each including, a first end, a second end, and an intermediate segment, wherein the intermediate segment is located adjacent the plate portion of the fuse assembly and is positioned to sever by movement of the plate portion so as to prevent light transmission from the first end of the fiber optic cable to the second end of the fiber optic cable, positioning a resistor adjacent to the intermediate segment of one of the cables; and providing instructions for checking the operational status of the fuse assemblies, including:

applying a light source to one end of the fiber optic cables;

observing which fiber optic cables transmit light to an opposite end.

14. The method of claim 13, further including replacement of the fuse panel if an insufficient number of fuse assemblies are operational.

15. The method of claim 13, wherein the light source is a flashlight.

* * * * *